United States Patent
Horng et al.

(10) Patent No.: US 7,649,291 B2
(45) Date of Patent: Jan. 19, 2010

(54) LIMIT STRUCTURE FOR MOTOR SPINDLE

(75) Inventors: Alex Horng, Kaohsiung (TW); To-Nien San, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 28 days.

(21) Appl. No.: 11/640,188

(22) Filed: Dec. 18, 2006

(65) Prior Publication Data

US 2007/0284957 A1 Dec. 13, 2007

(30) Foreign Application Priority Data

Nov. 6, 2006 (TW) ............................... 95140970 A

(51) Int. Cl.
*H02K 5/16* (2006.01)
(52) U.S. Cl. ........................................ 310/90; 384/286
(58) Field of Classification Search .................. 310/90, 310/88, 67 R; 384/286
See application file for complete search history.

(56) References Cited

U.S. PATENT DOCUMENTS

| 6,024,496 A * | 2/2000 | Shy ............................. 384/279 |
| 6,538,355 B1 * | 3/2003 | Horng et al. ................... 310/91 |
| 2002/0089106 A1 * | 7/2002 | Horng ......................... 267/161 |
| 2002/0145183 A1 * | 10/2002 | Horng et al. ................ 257/678 |
| 2007/0210660 A1 * | 9/2007 | Horng et al. ................... 310/90 |
| 2007/0257571 A1 * | 11/2007 | Hong et al. ............... 310/67 R |

* cited by examiner

*Primary Examiner*—Vit W Miska
*Assistant Examiner*—Sean Kayes
(74) *Attorney, Agent, or Firm*—Bacon & Thomas, PLLC

(57) ABSTRACT

The present invention relates to a limit structure for motor spindle, which includes a base equipped with a shaft tube and a stator set. A limit member and a bearing are disposed inside a shaft tube such that a spindle can be inserted and rotated in the bearing. The inner wall of a through hole of the limit member has plural limit protrusions extended toward a center of the through hole for snapping a necking of a nose of a spindle to limit its axial displacement. The limit protrusion forms a non-vertical included angle with the inner wall of the through hole in a tilted manner. Therefore, when the limit protrusions are subjected to compression of the nose of the spindle, its deformation is so small that irrecoverable condition and fracture of the limit protrusion and rotor drop can be prevented.

9 Claims, 7 Drawing Sheets

LIMIT STRUCTURE FOR MOTOR SPINDLE

FIELD OF THE INVENTION

The present invention relates to a limit structure for motor spindle, and more particularly to a practical structure that is operationally durable and hard to be broken so as to prevent rotor runout, vibrational noise and rotor drop.

BACKGROUND OF THE INVENTION

As shown in FIG. 1, a conventional motor structure includes a rotor 10, in which its center is stationarily coupled to one end of a spindle 11, and the other end is a spindle nose 12 having a necking 13 with a smaller outer diameter; a base 20 having a shaft tube 21 and a stator set 26 disposed thereon, in which the shaft tube 21 can be assembled or integrally formed on the base 20 and an abrasive pad 22, a limit member 30, a bearing 23 and a washer 24 are disposed therein, a position member 25 corresponds to the top end of the shaft tube 21 and caps thereon so as to steadily position the bearing 23, the limit member 30, etc. inside the shaft tube 21, and the stator set 26 is located on the periphery of the shaft tube 21 and can be chosen from either a radial winding type or an axial winding type structure.

A plurality of limit protrusions 31 are extended from the angular periphery of the limit member 30 to the center thereof in a radial manner, such that a groove (not shown in FIG. 1) is formed between every two neighboring limit protrusions 31 and a snap hole 32 is centrally formed within each limit protrusion 31.

Hence, while assembling the rotor 10 and the base 20, the spindle 11 of the rotor 10 needs to first penetrate the position member 25, the washer 24 and the bearing 23. Because the diameter of the snap hole 32 of the limit member 30 is slightly less than the outer diameter of the nose 12 of the spindle 11 as shown in FIG. 2(A), a larger force shall be exerted on the nose 12. Moreover, the groove formed between every two neighboring limit protrusions 31 forces the limit protrusion 31 to deform and make the snap hole 32 expand as shown in FIG. 2(B), so as to facilitate the nose 12 to pass through the snap hole 32, and then the limit protrusions 31 further return to snap the necking 13 so as to limit axial displacement of the spindle 11 with respect to the shaft tube 21 and prevent the rotor 10 from dropping.

Whereas, while the limit protrusions of the limit member are compressed by the nose of the spindle and the snap hole is forced to expand, the limit protrusions are subjected to an excessively bending and deforming angle, which gives rise to the following shortcomings;

Irrecoverable angle of the deformed limit protrusions: The material employed by the limit member shall possess hardness with at least a certain level; otherwise, axial displacement of the spindle cannot be reliably restrained, and thus occurrence of rotor drop becomes inevitable. Meanwhile, such requirement also makes the limit protrusion less flexible. The limit protrusion of the conventional limit member structure forms a right included angle (90°) with an angular periphery such that each limit protrusion exhibits a horizontal pattern. Therefore, when the limit protrusions are subjected to compression applied by the nose of the spindle and are deformed, the angle of the limit protrusion between an original position and a crooked and deformed position is approximately 45°, making the limit protrusions irrecoverable to their original angle, as shown in FIG. 2(C), after the limit protrusions are deformed.

Fracture of the limit protrusion due to excessive deformation: As mentioned in last paragraph, to take the basic strength of the limit member itself into account and prevent rotor drop, a harder material shall be selected. Accordingly, as a result of insufficient flexibility, the limit protrusions are impossible to recover to their original angle after they are subjected to compression of the spindle nose and deformed or even results in fracture of the limit protrusion as shown in FIG. 2(C).

Huge vibrational noise during rotor rotation: A space is designed between the limit member and an abrasive pad inside the shaft tube for the motor structure to store lubricant; after the limit protrusion of the conventional limit member structure is broken, the broken limit protrusion will drop in the lubricant storage space and is attached to the spindle nose due to the viscosity of the lubricant; consequently, the broken limit protrusion accompanies with the spindle to keep churning and colliding in the course of rotation of the spindle, thus resulting in noise and blockage against rotational smoothness of the spindle and rotational vibration of the rotor.

Easy rotor runout: While the rotor is rotating, a reaction force will make the rotor generate an ascending buoyancy force; the limit protrusions are used to snap the necking so as to prevent the rotor from dropping; meanwhile, the limit protrusions urge against the end face of one side of the necking near the nose as shown in the position marked by the broken line in FIG. 2(C). As such, when a portion of the limit protrusion of the conventional limit member is broken, the urging force against the end face is out of balance, thereby making the rotor generate rotation runout.

Easy rotor drop: When one portion of a limit protrusion of the conventional limit member structure is broken, in addition to the rotation runout of the rotor, the overall strength of the limit protrusion is relatively reduced. Once the motor structure is subjected to impact of external force, the occurrence of rotor drop easily takes place.

As a consequence, to completely tackle the issue intrinsic to the above-mentioned conventional limit member structure, a limit structure of motor spindle with a brand new idea must be aggressively conceived and developed to resolve rotor runout, vibrational noise and rotor drop.

SUMMARY OF THE INVENTION

In view of the foregoing concern, the present invention thus provides a limit structure for motor spindle, which includes a rotor, in which its center is stationarily coupled to one end of a spindle, and the other end is a spindle nose having a necking with a smaller outer diameter; a base having a shaft tube and a stator set disposed thereon, in which a limit member and a bearing disposed inside the shaft tube for the spindle to rotationally disposed in the bearing.

The limit member has a through hole, and a plurality limit protrusions disposed on the inner wall of the through hole and extended toward a center of the through hole for snapping the necking of the spindle to limit its axial displacement.

As the limit protrusion of the present invention shall form a non-vertical included angle with the inner wall of the through hole, the top and bottom sides of each limit protrusion exhibit a tilting form that the included angle is larger over one side and smaller over the other side. Hence, when a nose of the spindle penetrates the limit protrusions by compressing the limit protrusions through the side having larger included angle first and then through the side having smaller included angle, the deformation is small so as to prevent irrecoverable condition after the limit protrusions are deformed and to simultaneously avoid fracture of the limit protrusion and rotor drop.

DETAILED DESCRIPTION OF THE PREFERRED EMBODIMENT

Figure 1:
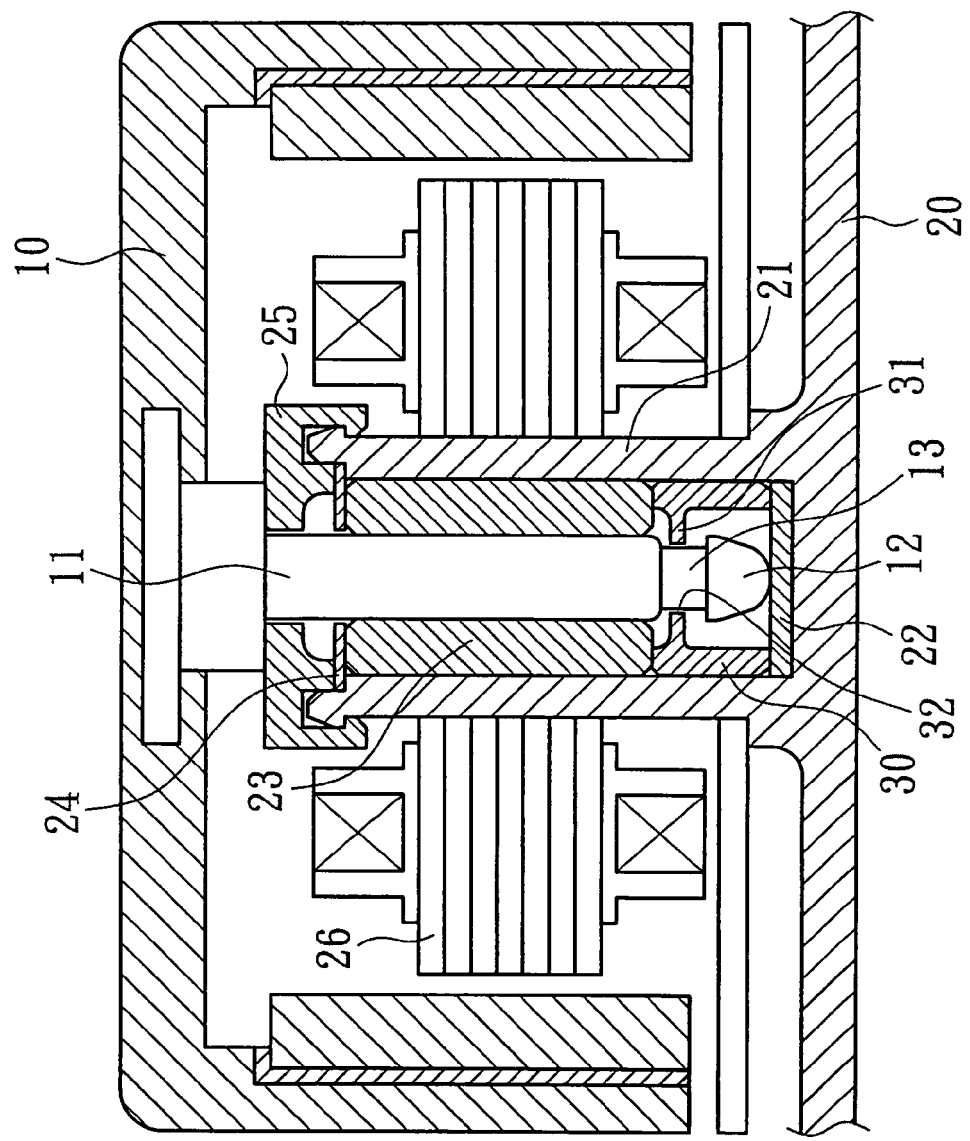
FIG. 1 is cross-sectional view showing a conventional motor structure.
Figure 2:
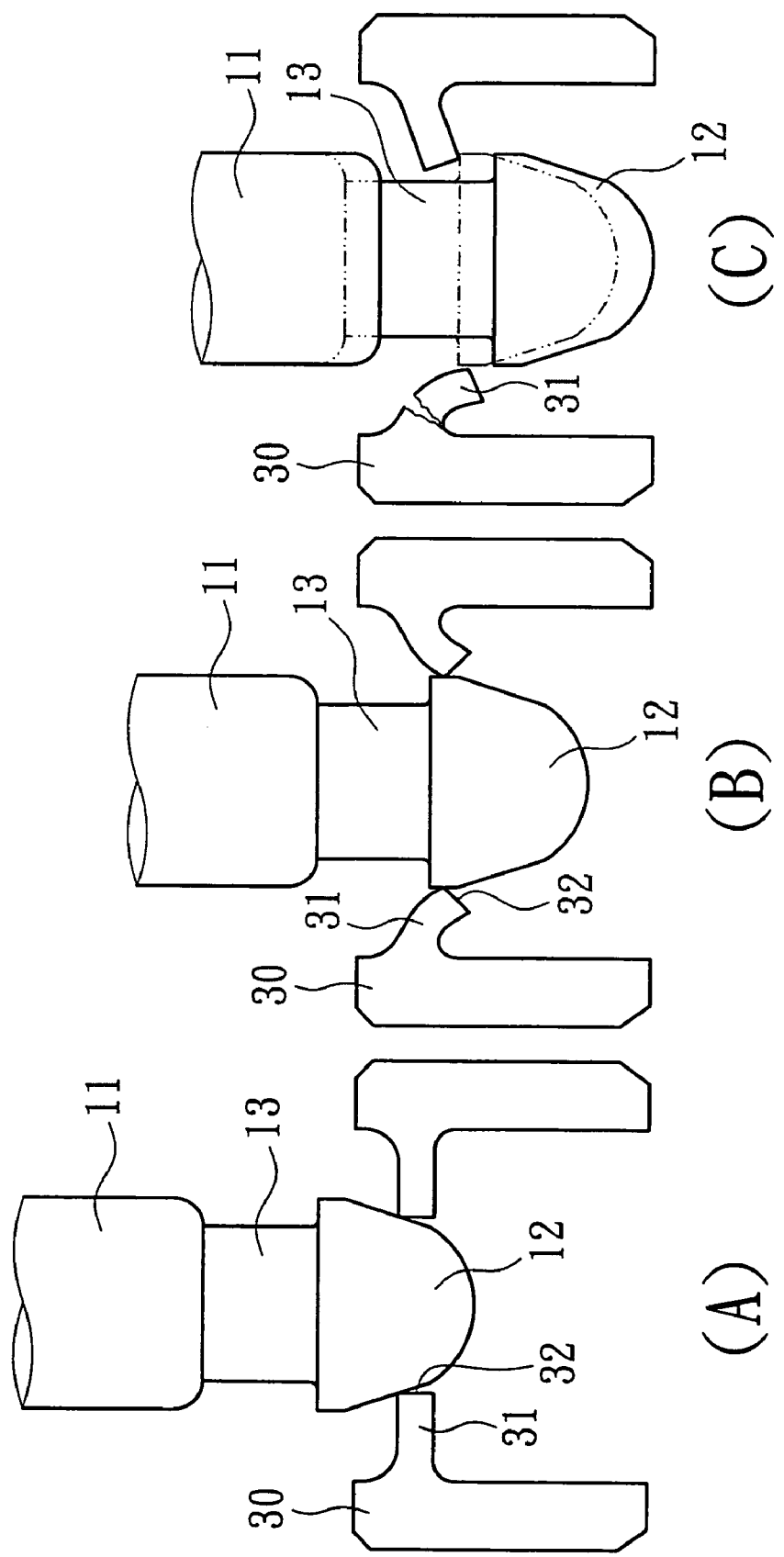
FIG. 2 is an implementation view showing a conventional limit structure.
Figure 3:
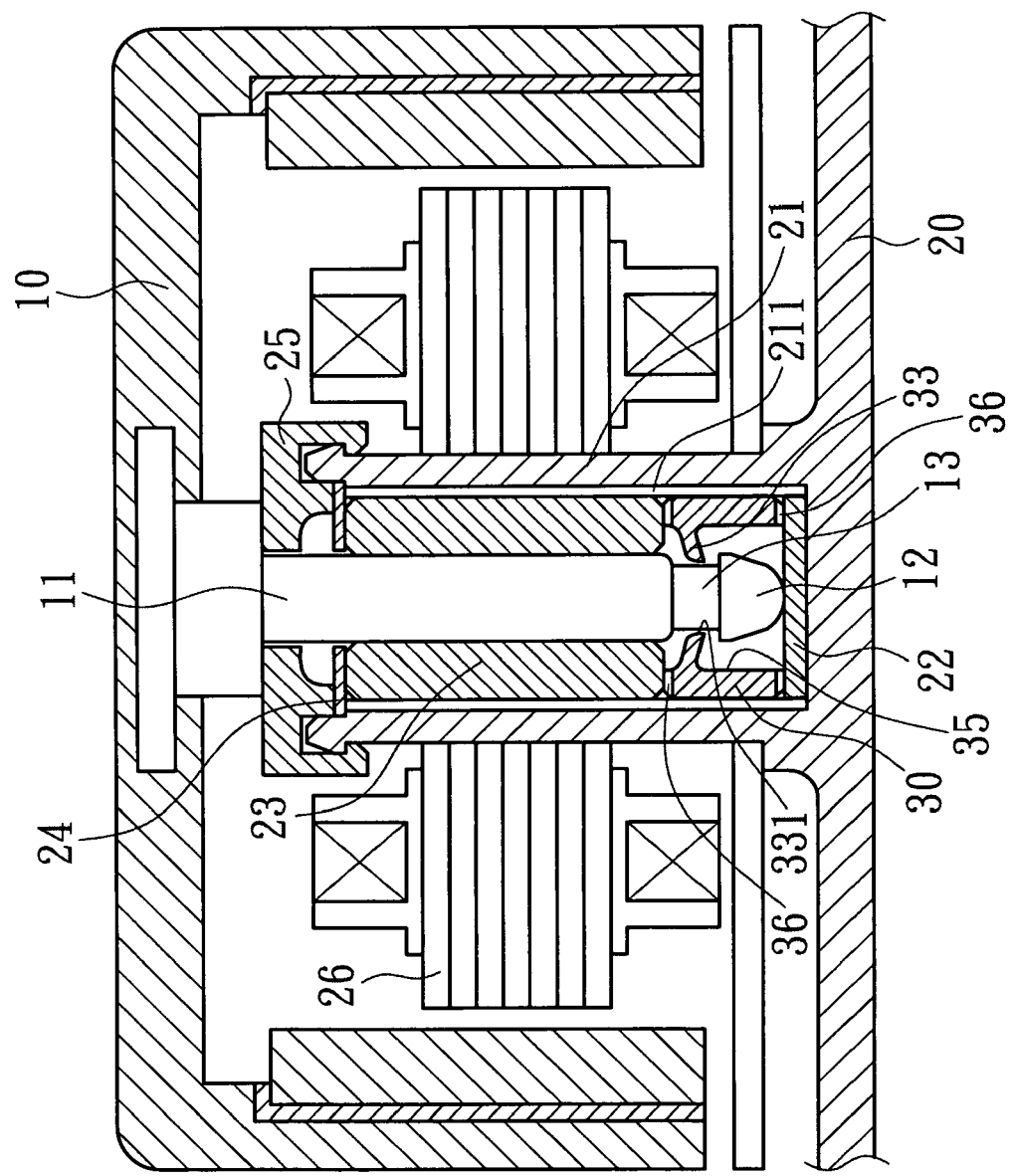
FIG. 3 is a cross-sectional view showing a motor structure of the present invention.
Figure 4:
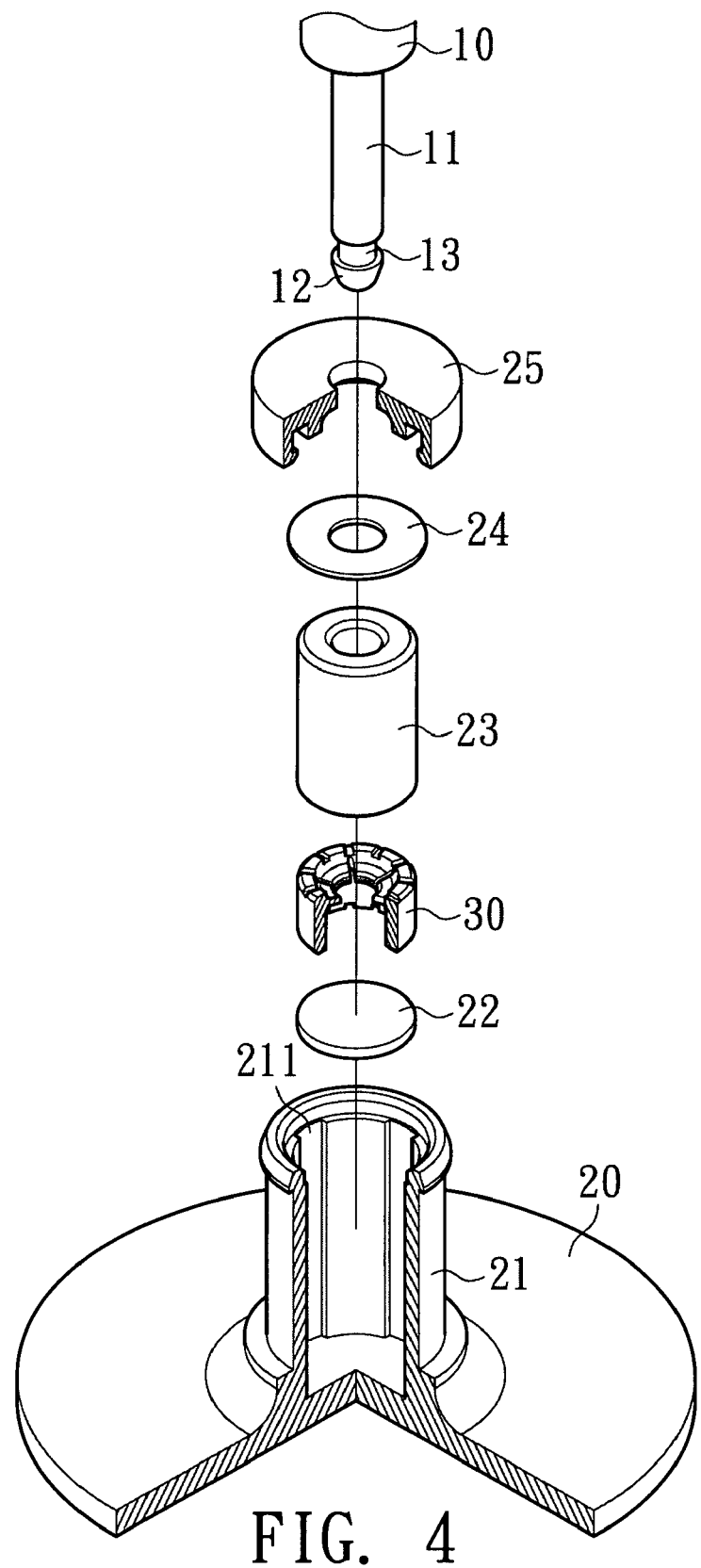
FIG. 4 is an partial exploded view showing a motor structure of the present invention.

The present invention relates to a limit structure for motor spindle as shown in FIG. 3 and FIG. 4. The limit structure includes a rotor 10, in which its center is stationarily coupled to one end of a spindle 11, and the other end is a spindle nose 12 having a necking 13 with a smaller outer diameter; a base 20 having a shaft tube 21 and a stator set 26 disposed thereon, in which the shaft tube 21 can be assembled or integrally formed on the base 20 and has at least one axial lubricant-guiding groove 211 on its inner wall, an abrasive pad 22, a limit member 30, a bearing 23 and a washer are disposed therein, a position member 25 corresponds to the top end of the shaft tube 21 and caps thereon so as to steadily position the bearing 23, the limit member 30, etc. inside the shaft tube 21, the bearing 23 can be selected from any one of sleeve bearing, ball bearing and hydrodynamic bearing for the spindle 11 to rotationally disposed therein, and the stator set 26 is located on the periphery of the shaft tube 21 and can be chosen from either a radial winding type or an axial winding type structure.

Figure 5:
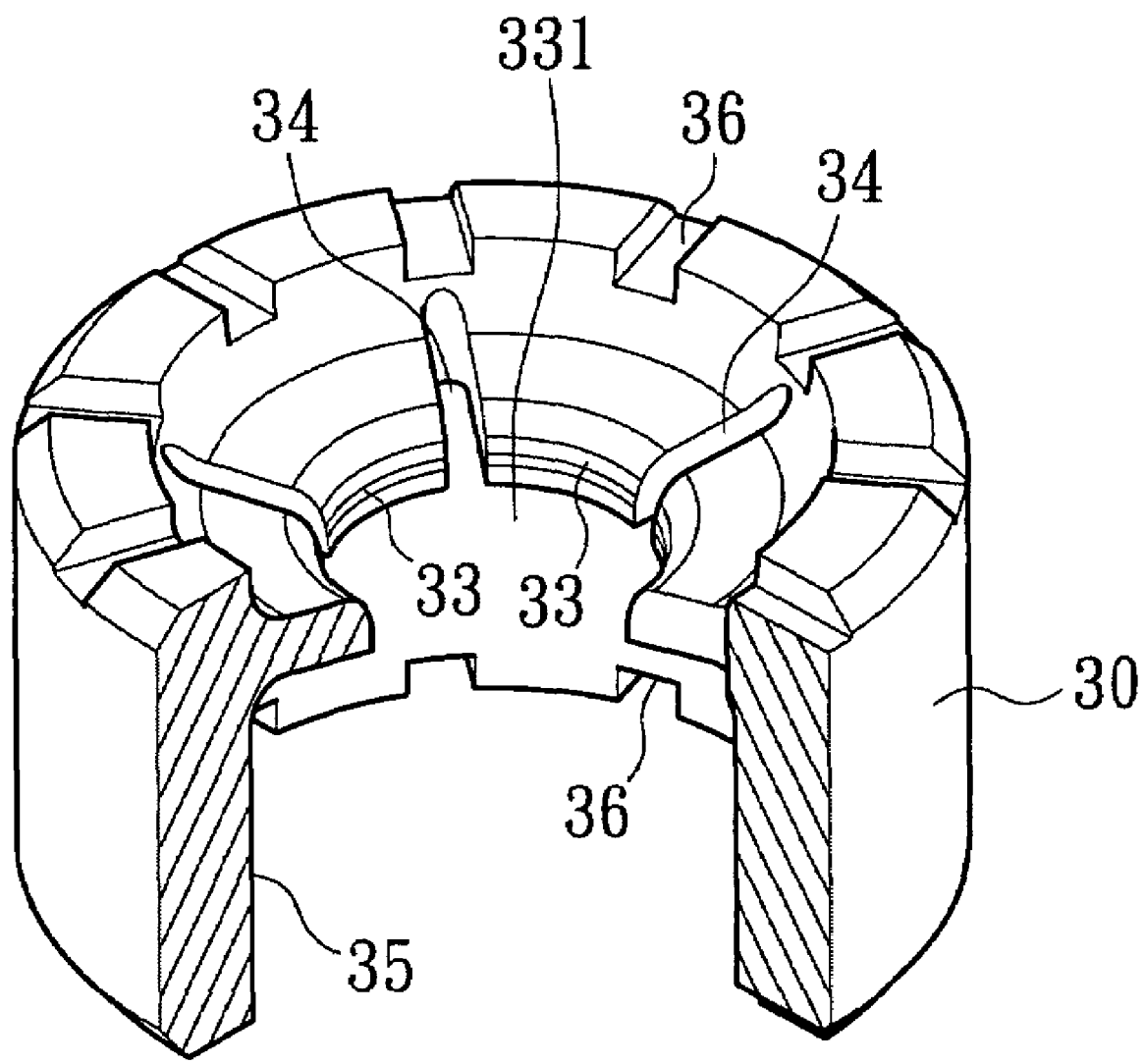
FIG. 5 is an exterior view showing a limit structure of the present invention.

Together with the reference to FIG. 5, at least an oil channel is disposed on the top and the bottom end faces of the limit member 30 respectively, a through hole 35 of the limit member 30 is centrally provided, a plurality of limit protrusions 33 are extended from the inner wall of the through hole 35 to a center of the limit member 30, the limit protrusion 33 forms a non-vertical includes angle with the inner wall of the through hole 35 such that a tilting pattern is constituted by the alignment of the top and the bottom surface of each limit protrusion 33 with the inner wall of the through hole to form a larger included angle over one side and a smaller included angle over the other side. Moreover, a groove 34 is formed between every two neighboring limit protrusions 33, and a snap hole 331 is centrally formed inside each limit protrusion 33.

Figure 6:
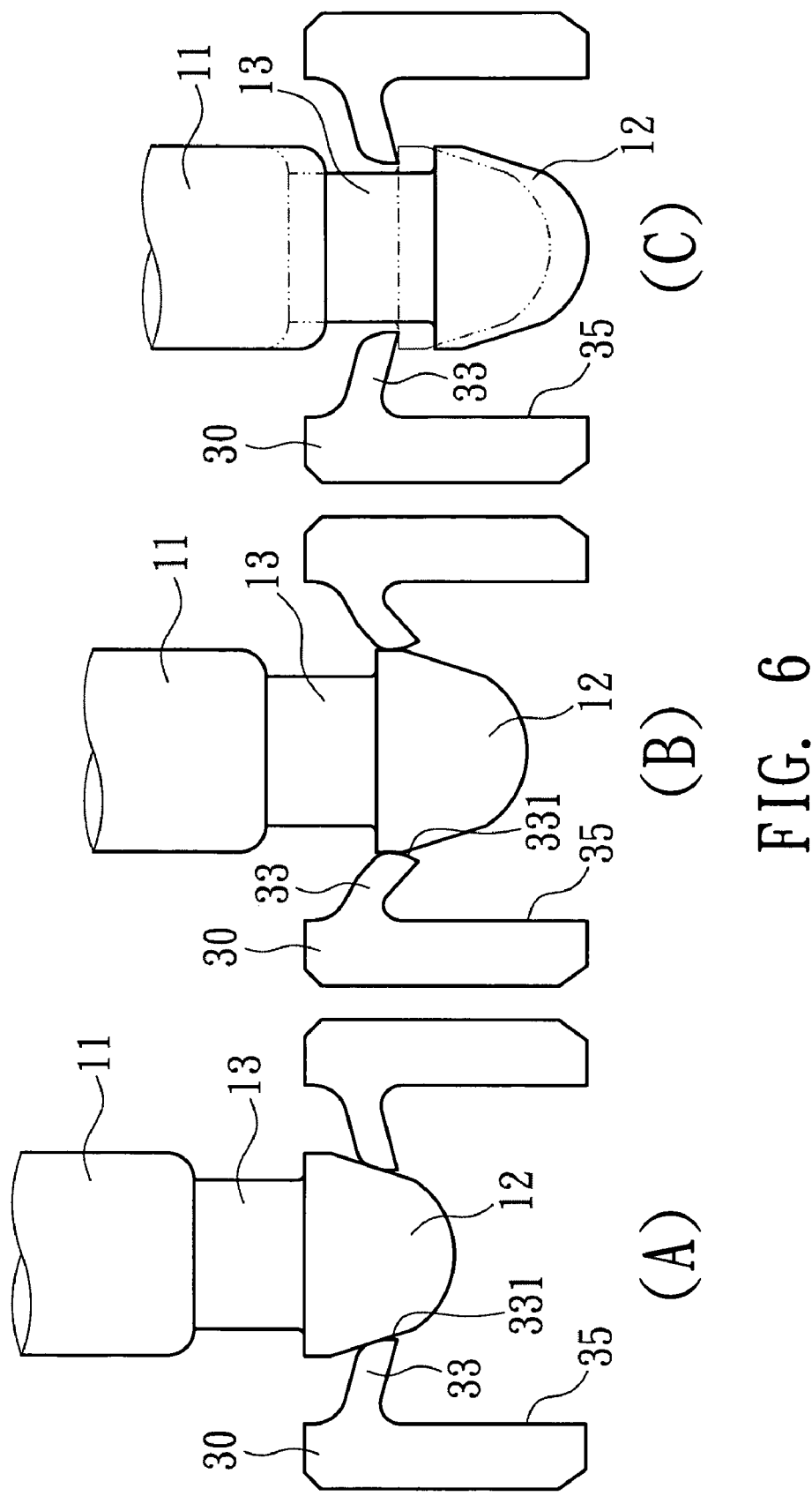
FIG. 6 is an implementation view of the limit structure of the present invention.

Therefore, while assembling the rotor 10 and the base 20, the spindle 11 of the rotor 10 is used to first pass through the position member 25, the washer 24 and the bearing 23 centrally such that the spindle 11 is centrally located within the bore of the aforementioned parts and rotated therein, and then penetrate through the limit protrusions of the limit member 30 through one side having larger included angle first and then through the other side having smaller included angle. As the diameter of the snap hole 331 with limit protrusions 33 is slightly less than the outer diameter of the nose 12 of the spindle 11 as shown in FIG. 6 (A), a larger external force shall be exerted on the nose 12; the grooves 34 formed between neighboring limit protrusions 33 further force the limit protrusion 33 to deform and further make the snap hole 331 expand as shown in FIG. 6(B), so as to allow the nose 12 to pass through the snap hole 331; the limit protrusion 33 promptly returns to snap the necking 13 as shown in FIG. 6(C) to limit axial displacement of the spindle 11 with respect to the shaft tube 21, so as to prevent the rotor 10 from dropping.

As the limit protrusions 33 of the limit member 30 in the present invention form a non-vertical angle with the inner wall of the through hole 35, a tilting pattern having a larger included angle over one side and a smaller included angle over the other side is formed on the top and bottom sides of each limit protrusion 33 respectively. Hence, when the nose 12 of the spindle 11 pushes in the side of the limit protrusion 33 having larger included angle and then turns to the side of the limit protrusion 33 having smaller angle, the deformation is so small that the irrecoverable condition of the limit protrusion 33 after being deformed can be avoided; meanwhile, fracture of the limit protrusion 33 and drop-off of the rotor 10 are also prevented. Furthermore, oil channels 36 are disposed on the top and the bottom end faces of the limit member 30 in the present invention respectively to form a lubricant circulation loop in cooperation with oil grooves on the inner wall of the shaft tube 21, thereby effectively lowering friction force of the spindle 11 and promoting the operational smoothness.

Figure 7:
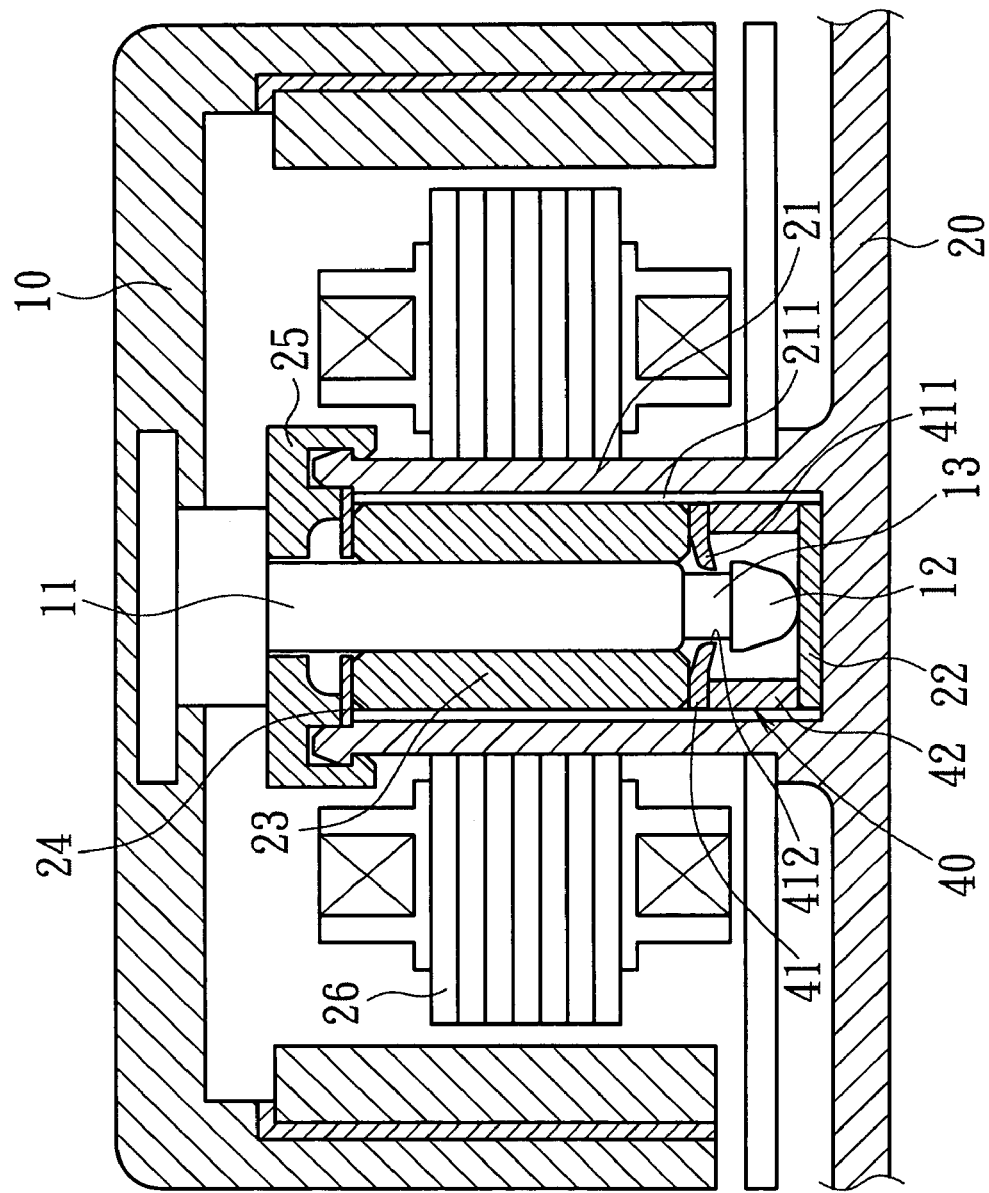
FIG. 7 is a cross-sectional view showing another embodiment of the present invention.

FIG. 7 shows another preferred embodiment of the present invention, which includes an abrasive pad 22, a limit member 40, a bearing 23 and a washer 24 that are disposed inside the shaft tube 21, a positioning member 25 corresponding to the opening of the top end of the shaft tube 21 and capped thereon facilitates to steadily position the bearing 23, the limit member 40, etc. inside the shaft tube 21.

The limit member 40 contains a snap ring 41 and a position ring 42, wherein the position ring 42 is disposed between the snap ring 41 and the abrasive pad 22 so as to provide a space formed between the snap ring 41 and the abrasive pad 22 for insertion of the nose 12 of the spindle 11. The snap ring 41 has a plurality of limit protrusions 411 extended toward a center of the limit member 40, each limit protrusion 411 forms an included angle with the plane at which the snap ring is located such that each limit protrusion 411 exhibits a tilting pattern that is not parallel to the plane, and when the snap ring 41 is placed in the shaft tube 21, one side of the limit protrusion 411 facing to the abrasive pad 22 is tilted, a groove (not shown) is formed between two neighboring limit protrusions 411, and each limit protrusion 411 has a snap hole 412 formed centrally therein.

Likewise, while assembling the rotor 10 and the base 20 and using the spindle 11 of the rotor 10 to first pass through the position member 25, the washer 24 and the bearing 23 centrally, a larger external force is further applied; the grooves formed between neighboring limit protrusions 411 of the snap ring 41 force the limit protrusions 411 to deform and make the snap hole 412 expand so as to allow the nose 12 to pass through the snap hole 412; the limit protrusions 411 then promptly return to snap on the necking 13 to limit axial displacement of the spindle 11 with respect to the shaft tube 21 and prevent the rotor 10 from falling off.

Similarly, as the limit protrusions of the snap ring 41 in the preferred embodiment is not parallel to the plane where the snap ring 41 is located and one side of each limit protrusion 411 facing to the abrasive pad 22 is in a tilted condition while it is assembled, the deformation of the limit protrusions is small while the limit protrusions are subjected to compression of the nose 12 of the spindle 11. Therefore, irrecoverable condition of the limit protrusion after the limit protrusion is deformed can be avoided, and fracture of the limit protrusions 411 and rotor drop of the rotor 10 can be avoided as well.

In contrast to the aforementioned conventional limit structure, the characteristics of the present invention at least includes:

After deformed by the nose of the spindle, the limit protrusions can be recovered to their initial angle: Despite the limitation of material used for the limit member itself, the limit protrusion of the limit member in the present invention forms a non-vertical included angle with the inner wall of the limit member, so as to constitute a larger and a smaller included angles between the inner wall of the through hole and the top and bottom sides of the limit protrusion respectively and to thus form a tilted pattern. As such, when the nose of the spindle pushes the limit protrusions through the side with larger included angle first and then through that with smaller included angle and penetrates through the limit protrusions, the deformation is reduced so as to prevent from going beyond elastic deformation, thereby eliminating the irrecoverable occurrence of the limit protrusion after it is compressed and penetrated.

Limit protrusions won't be broken: As mentioned in preceding paragraph, the limit protrusions of the limit member in the present invention are formed on the inner wall of the through hole in a tilted manner. Therefore, deformation of the limit protrusions can be reduced, excessive elastic deformation can be prevented and fracture of the limit protrusions can be avoided.

No vibrational noise during rotor rotation and good stability: As the limit protrusions of the limit member in the present invention are hard to be bent and cracked and operationally durable, each limit protrusion can smoothly support the rotor to rotate while the rotor is rotating, so as to prevent the runout of the rotor and vibrational noise and make rotation of the rotor stable and smooth.

No rotor drop: As mentioned, the limit member of the present invention not only can steadily support the rotor to rotate but also effectively prevent the rotor from coming off during rotation.

In sum, from the above-mentioned characteristics those features not only has a novelty among similar products and a progressiveness, but also has an industry utility While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A limit structure for a motor spindle, comprising:
   a rotor;
   a spindle having one end stationarily coupled to a center of said rotor and the other end being a nose having a necking with a reduced diameter;
   a base having a shaft tube and a stator set, wherein said shaft tube has a limit member and a bearing disposed therein for rotationally supporting said spindle in said bearing, said limit member has an inner wall forming a through hole in said limit member and a plurality of limit protrusions extended from the inner wall to a center of said through hole, said plurality of limit protrusions arranged to receive said nose and to snap said necking of said spindle to limit an axial displacement thereof, each of said plurality of limit protrusions forms a non-vertical included angle respectively with said inner wall in a tilted manner by constituting a larger included angle between a top side of each said limit protrusion and said inner wall and a smaller included angle between a bottom side of each said limit protrusion and said inner wall, said spindle is inserted in said through hole through said top side having larger included angle first and then through said bottom side having smaller included angle;
   an abrasive pad disposed inside said shaft tube, wherein said spindle urges against the abrasive pad; and
   a position member corresponding to an opening at a top end of the shaft tube, wherein the position member caps onto the shaft tube so as to steadily position the bearing and the limit member inside the shaft tube,
   wherein a groove is formed between adjacent limit protrusions, and each said limit protrusion has a snap hole centrally formed therein for inserting said nose of said spindle in said snap hole, and
   wherein each limit protrusion has a top surface and a bottom surface opposing the top surface, the larger included angle is formed between the top surface and the inner wall, and the smaller included angle is formed between the bottom surface and the inner wall.

2. The limit structure of claim 1, wherein at least an oil groove is disposed on said top and bottom sides of said limit member respectively.

3. The limit structure of claim 1, wherein said shaft tube is assembled on said base, and at least an axial lubricant-guiding groove is disposed on said inner wall.

4. The limit structure of claim 1, wherein said shaft tube is integrally formed on said base, and at least an axial lubricant-guiding groove is disposed on said inner wall.

5. The limit structure of claim 1, wherein the top surface and the bottom surface both extend directly from the inner wall.

6. A limit structure for a motor spindle, comprising:
   a rotor;
   a spindle having one end stationarily coupled to a center of said rotor and the other end being a nose having a necking with a reduced diameter;
   a base having a shaft tube and a stator set, wherein said shaft tube has a limit member and a bearing disposed therein for rotationally supporting said spindle in said bearing, said limit member has a snap ring and a position ring, said snap ring extending in a plane being sandwiched between said bearing and said position ring and has a plurality of limit protrusions extended toward a center of said limit member, said plurality of limit protrusions receiving said nose and snapping said necking of said spindle to limit an axial displacement thereof, each said limit protrusion forms an included angle with the plane of said snap ring such that each said limit protrusion is not parallel to said plane and faces to said nose of said spindle in a tilted manner;
   an abrasive pad disposed inside said shaft tube, wherein said spindle urges against the abrasive pad; and
   a position member corresponding to an opening at a top end of the shaft tube, wherein the position member caps onto the shaft tube so as to steadily position the bearing and the limit member inside the shaft tube,
   wherein a groove is formed between adjacent limit protrusions, and a snap hole is centrally formed within each said limit protrusion for inserting said nose of said spindle therein,
   wherein each limit protrusion has a top surface and a bottom surface opposing the top surface, and the top surface and the bottom surface both extend from the snap ring in the tilted manner.

7. The limit structure of claim 6, wherein said shaft tube is assembled on said base, and at least an axial lubricant-guiding groove is disposed on said inner wall.

8. The limit structure of claim 6, wherein said shaft tube is integrally on said base, and at least an axial lubricant-guiding groove is disposed on said inner wall.

9. The limit structure of claim 6, wherein the top surface and the bottom surface both extend directly from the snap ring.

* * * * *